United States Patent
Willson (10) Patent No.: US 11,845,036 B2
(45) Date of Patent: Dec. 19, 2023

(54) APPARATUS FOR DESUBLIMING A TARGET COMPOUND

(71) Applicant: PMW Technology Ltd., Hebden Bridge (GB)

(72) Inventor: Paul Willson, Hebden Bridge (GB)

(73) Assignee: PMW TECHNOLOGY LTD., Hebden Bridge (GB)

( * ) Notice: Subject to any disclaimer, the term of this patent is extended or adjusted under 35 U.S.C. 154(b) by 1207 days.

(21) Appl. No.: 16/324,171

(22) PCT Filed: Aug. 17, 2017

(86) PCT No.: PCT/GB2017/052431
§ 371 (c)(1),
(2) Date: Feb. 8, 2019

(87) PCT Pub. No.: WO2018/033737
PCT Pub. Date: Feb. 22, 2018

(65) Prior Publication Data
US 2022/0080345 A1 Mar. 17, 2022

(30) Foreign Application Priority Data
Aug. 17, 2016 (GB) ..................... 1614095

(51) Int. Cl.
*B01D 53/00* (2006.01)
*B01D 7/02* (2006.01)

(52) U.S. Cl.
CPC .............. *B01D 53/002* (2013.01); *B01D 7/02* (2013.01); *B01D 2257/504* (2013.01); *B01D 2257/7027* (2013.01); *B01D 2258/0283* (2013.01)

(58) Field of Classification Search
None
See application file for complete search history.

(56) References Cited

U.S. PATENT DOCUMENTS 4,337,071 A  6/1982 Yang
4,769,054 A * 9/1988 Steigman ................. B01D 8/00
                                                            62/541

(Continued)

FOREIGN PATENT DOCUMENTS

AU        464 179    8/1975
DE       41 34 293   2/1993

(Continued)

OTHER PUBLICATIONS

Dictionary.com-"isolated" definition. https://www.dictionary.com/browse/isolated (Year: 2023).*

(Continued)

*Primary Examiner* — Jelitza M Perez
(74) *Attorney, Agent, or Firm* — Ping Wang; Rimon Law (57) ABSTRACT

The present invention provides an apparatus for desubliming a target compound from a first gas mixture comprising the target compound, comprising: a desublimation means comprising a surface onto which desublimation of the target compound can occur, an inlet through which the first gas mixture can enter the apparatus such that it comes into contact with the surface of the desublimation means, a target compound recovery region, an outlet through which the target compound can leave the target compound recovery region and a cooling means that cools the desublimation means wherein the desublimation means comprises a continuous path that passes through the cooling means and the target compound recovery region and wherein the desublimation means is movable such that the surface continuously circulates between the cooling means and the target compound recovery region, along the path.

19 Claims, 2 Drawing Sheets

(56) References Cited

U.S. PATENT DOCUMENTS

| | | | | |
|---|---|---|---|---|
| 5,307,638 A | * | 5/1994 | Herzog | B01D 7/02 62/62 |
| 2012/0153514 A1 | * | 6/2012 | Baxter | B01D 7/02 261/128 |

FOREIGN PATENT DOCUMENTS

| | | |
|---|---|---|
| GB | 1 371 129 | 10/1974 |
| JP | S56166901 | 12/1981 |
| WO | 2012068588 | 5/2012 |

OTHER PUBLICATIONS

International Search Report of International Application No. PCT/GB2017/052431 dated Feb. 15, 2018.
Combined Search and Examination Report under Sections 17 and 18(3) of Application No. GB1614095.6 dated Feb. 16, 2017.
International Report on Patentability from International Application No. PCT/GB2017/052431 dated Feb. 28, 2019.

* cited by examiner

APPARATUS FOR DESUBLIMING A TARGET COMPOUND

This application is a national stage application of International Patent Application No. PCT/GB2017/052431, filed Aug. 17, 2017, which claims priority to United Kingdom patent Application No. 1614095.6, filed Aug. 17, 2016. The entirety of the aforementioned applications is incorporated herein by reference.

FIELD

The present invention concerns an apparatus for desubliming a target compound from a first gas mixture comprising the target compound, as well as a method for doing the same.

BACKGROUND

Separation processes such as distillation enable mixtures of compounds to be separated according to their vapour pressures at different temperatures. Some compounds such as carbon dioxide or phthalic anhydride deposit as solids from vapour when cooled under certain conditions that prevent effective separation by distillation. These target compounds require more complex and costly separation processes.

Industrial processes for the treatment of natural gas often include the separation of carbon dioxide from the raw gas. Similarly, the production of ammonia requires the separation of carbon dioxide from a process gas. These separations add complexity and increase energy consumption of these processes.

With the growing concerns regarding pollution and global warming, the removal of carbon dioxide (a known greenhouse gas) from waste gases is becoming more important. However, including an additional step to remove carbon dioxide in any industrial process can unacceptably increase the cost, complexity and energy consumption of the overall process.

Carbon capture technologies fall into three groups, namely post combustion capture, oxy-fuel combustion and pre-combustion decarbonisation. Post combustion processes include amine absorption, pressure and temperature swing absorption and cryogenic separation. Oxy-fuel combustion is analogous to conventional power generation cycles but burns the fuel in oxygen diluted with recycled combustion gases rather than nitrogen as in air. Pre-combustion decarbonisation performs chemical processes on the fuel to remove the carbon before the main combustion process. The integrated gasifier combined cycle (IGCC) breaks down a fuel by partial combustion and can include a carbon dioxide removal step from the synthetic fuel gas.

Different processes implementing these alternative approaches have been developed, with post-combustion technology using amines being relatively well established at demonstrator scale, while oxy-fuel and IGCC carbon capture processes are at an earlier stage of pilot work prior to demonstrator scale.

At pressures below about 5 bara carbon dioxide desublimes as frost, rather than condensing as a liquid when it is cooled. Various cryogenic processes that exploit this behaviour have been suggested to separate carbon dioxide from a flue gas. However, these processes often require increased complexity and higher energy consumption in order to address this issue.

WO2009070785 discloses a method for separating carbon dioxide from a flue gas, which involves lowering the temperature of the flue gas such that the carbon dioxide condenses and/or desublimes and can be separated from a light-gas stream. The light-gas stream is then used in cooling steps earlier in the process. Specifically, the temperature of the flue gas is preferably reduced by expanding the gas so that the carbon dioxide condenses and/or desublimes as a suspension in the light-gas stream.

However, this process requires the removal of water from the flue gas before lowering its temperature, which increases the cost and complexity of the process. Additionally, some carbon dioxide will solidify on the surfaces of the chambers in which condensation and/or desublimation occurs. This carbon dioxide then has to be recovered separately, using mechanical means. The lowest temperature after expansion also limits the potential level of carbon dioxide removal in this process. To achieve a high degree of carbon dioxide removal requires a large pressure drop and hence high energy consumption.

A different approach that makes use of the desublimation of carbon dioxide onto a surface (referred to as frosting) is described in M Tuinier et al., "Cryogenic $CO_2$ Separation by Dynamically Operated Packed Beds", Chemical Engineering Science 65, 2010. This approach involves passing flue gases over a bed of beads cooled to below the temperature for desublimation. As the gas passes over the bed, carbon dioxide and water are deposited in fronts of frost that move along the bed in the direction of the gas flow. Once the carbon dioxide front reaches the end of the bed, such that carbon dioxide is present in the gas leaving the system, the maximum amount of carbon dioxide has been removed. A regeneration cycle then occurs, in which the flue gases are replaced by a pure carbon dioxide flow to recover the frosted carbon dioxide, regenerating the packed bed and creating a purified carbon dioxide stream.

An alternative desublimation means is disclosed in JPS56166901. This document discloses a method for recovering carbon dioxide from a gas using fluidised beds of inert particles. The particles cool the gas stream in one fluidised bed tower, such that the carbon dioxide desublimes onto the particles. The particles coated with carbon dioxide are then passed into a second fluidised bed tower with a higher temperature, such that the carbon dioxide is released by sublimation. The residual carbon dioxide content is determined by the temperature of the cold fluidised bed and the large temperature drop required is provided by energy costly refrigeration.

GB1371129 also discloses an apparatus for separating a sublimable compound from a gas. In this case, the target compound is phthalic anhydride. This document discloses passing the gas into a fluidised bed of cooled beads, such that phthalic anhydride is separated from the gas. The phthalic anhydride is then removed from the particles by attrition.

BRIEF DESCRIPTION OF THE DRAWINGS

The invention will now be more particularly described with reference to the following figures, in which.

DETAILED DESCRIPTION

A means for removing a target compound such as carbon dioxide from a gas that is low cost, of reduced complexity and with low energy consumption such that it can be incorporated into existing processes, but which also efficiently removes a high level of the target compound is therefore required.

According to the present invention there is provided an apparatus for desubliming a target compound from a first gas mixture comprising the target compound, comprising: a desublimation means comprising a surface onto which desublimation of the target compound can occur, an inlet through which the first gas mixture can enter the apparatus such that it comes into contact with the surface of the desublimation means, a target compound recovery region, an outlet through which the target compound can leave the target compound recovery region and a cooling means that cools the desublimation means, wherein the desublimation means comprises a continuous path that passes through the cooling means and the target compound recovery region and wherein the desublimation means is movable such that the surface continuously circulates between the cooling means and the target compound recovery region, along the path.

The first gas mixture comprises one or more other components in addition to the target compound. The apparatus of the present invention therefore provides a continuous means of separating the target compound from the first gas mixture comprising one or more other components. This is more cost efficient and quicker than the prior art methods that have to be run in separate phases to initially desublime and subsequently recover the target compound. In fact, the cost of carbon capture using the present invention to remove carbon dioxide is substantially lower than alternative carbon capture technologies.

This may be at least partially due to the apparatus of the present invention utilising fixed conditions in each region of the desublimation means path. This means that there are no heating and cooling cycles within different regions, as are used in the arrangements of the prior art, which waste energy.

The desublimation means may move continuously at a single speed, or the speed may vary. The desublimation means is preferably continuously moving at a single speed. The desublimation means may move in stages, such that portions of the desublimation means have dwell times within the certain regions where the desublimation means is moving more slowly or not moving.

The use of a continuously moving desublimation means creates a static frosting front for the target compound, as it is the desublimation means that is moving rather than the front itself. This is fundamentally different to the arrangement of Tuinier et al., which relies on the movement of frosting fronts along the desublimation means. The static frosting fronts also mean that the process is easier to control and more efficient, as the location of the frosting fronts is known. In contrast, the arrangement described in Tuinier et al. will necessarily result in some carbon dioxide remaining in the outlet gas due to the alternation of flue gas and carbon dioxide through the desublimation means and will have a higher energy requirement for cooling.

In contrast to many arrangements of the prior art, the apparatus of the present invention does not have to be run at atmospheric pressure or high pressures and instead can make use of modestly elevated pressures, typically in the range of 2 to 10 bara throughout. Any pressure from atmospheric upwards may be used, depending on the performance required. This further reduces the cost, complexity and size of the apparatus. Additionally, this avoids the risk involved in running the apparatus at higher pressures.

The apparatus of the present invention can also be easily retrofitted into existing systems to remove a target compound such as carbon dioxide from, for example, flue gases. This is partly due to the simplicity of the apparatus and it avoids the complex interfaces and hazardous chemicals typical of most carbon capture processes. Particularly, the apparatus only requires a gas feed, such as a flue gas feed and electric power in order to function.

The apparatus of the present invention also has a lower cost of operation and so does not unduly increase the cost of existing processes. This is partly due to the low energy consumption per tonne of carbon dioxide recovered, which is comparable to or better than that for alternative technologies. Further, it does not make use of costly chemical reagents or other components that have a restricted life, which would require continuous make-up or frequent replacement. There are therefore no operating costs apparent beyond the power consumption.

Additionally, the present invention makes use of conventional cryogenic processes and active elements, which are readily available for use in arrangements such as nitrogen refrigerators for LNG production. The capital costs are also likely to be significantly lower than for a comparable scale carbon capture apparatus of the prior art.

Unlike processes of the prior art, the first gas mixture does not have to be dried before it enters the apparatus of the present invention. Any water present in the first gas mixture can be removed using phase changes in the apparatus, without the risk of plugging by ice or high pressure drops that can occur in the arrangements of the prior art. There is also no need for clean-up of the target compound or further removal of water downstream of the apparatus, as the target compound that is removed from the apparatus has minimal levels of contaminants.

The target compound is sublimable. The target compound may be carbon dioxide.

It has also been shown that the apparatus of the present invention can remove carbon dioxide from a gas to lower residual concentrations than arrangements of the prior art, without excessive increases in size, complexity or energy consumption. The level of carbon dioxide in the waste gas may be less than 0.2% and levels of one tenth of this appear to be feasible. The removal of carbon dioxide is therefore above 98% of the carbon dioxide content, compared to around 90% for other post-combustion processes known in the art. This can result in exhaust gases containing less than natural atmospheric levels of carbon dioxide, which are around 0.04%. This is not economically feasible in the arrangements of the prior art.

As used herein, the second gas mixture is the first gas mixture once some or all of the target compound has been removed using the invention disclosed herein. The second gas mixture may comprise one or more components, but comprises a lower amount of the target compound than the first gas mixture. The second gas mixture may be the gas that is released from the apparatus. The second gas mixture may be a waste product or may be a desired cleaned product.

The lowest temperature of the desublimation means determines the residual level of the target compound in the second gas mixture. The arrangement of the present invention allows a temperature to be selected to extract the desired fraction of the target compound from the first gas mixture. By varying this temperature, the residual carbon dioxide content in the second gas mixture may be selected to be in the range 0.02 to 1% when the target compound is carbon dioxide. Depending on the initial fossil carbon dioxide content of the gas, the apparatus may remove between 70% and 100% of the fossil carbon dioxide content of a flue gas and up to 50% of the natural atmospheric carbon dioxide content.

The table below compares the performance, capital cost, impact on operating costs and ease of application to new and existing coal-fired power plant of the present invention when used in a post-combustion process to other known technologies in other processes. The row corresponding to the present invention, when used to remove carbon dioxide, is shaded grey.

apparatus of the present invention and its avoidance of hazardous chemicals mean that it would be simple to deploy at smaller scales. Another area, which is a major contributor to UK carbon emissions, is the transport sector. There appear to be good prospects for substantially reducing carbon dioxide emissions from cars. However, elimination of such emissions from long haul transport by cars, heavy good vehicles and shipping presents a challenge as their demand for bio-fuels would be too large and their ability to exploit battery storage would be limited.

The apparatus of the present invention is scalable upwards from less than 1 MW fuel use. The apparatus could be used in a car, a ship or an HGV or in a natural gas processing plant or ammonia plant to reduce the carbon dioxide or other target compound content of the waste or desired gases produced therefrom. Also disclosed herein is therefore a car, a ship or an HGV or other industrial process plant compris-

| Process | Technology | Typical Capture | Capex £/kW | Output loss | O&M impact | Application to new plant | Retrofit to existing plant |
| --- | --- | --- | --- | --- | --- | --- | --- |
| Post combustion | amine | ca 90% | 2773 | ca 28% | significant | straightforward | difficult |
| Post combustion | BYU cryogenic | ca 90% | 1850 | Est 20% | modest | straightforward | straightforward |
| Post combustion | Advanced cryogenic | ca 99% | 1900 | 20-22% | minimal | straightforward | straightforward |
| Oxy-fuel pressure | low | ca 99% | 2399 | ca 26% | modest | more complex | difficult |
| Pre-combustion | IGCC | ca 90% | 3202 | ca 20% | significant | more complex | extensive |

It can be seen that the present invention offers a comparable capture performance to oxy-fuel but offers a simpler approach for both new and retrofit applications than other technologies. Current un-optimised estimates of the loss of output associated with the present invention are that it is comparable or slightly higher than for IGCC or the competing cryogenic process, but better than any other alternative. Unlike the other processes, the operation and maintenance costs associated with the consumption of process reagents of the present invention are minimal. The comparison of capital cost shows that the present invention has a significant advantage over the other processes. The costs of the present invention have been estimated on the basis of analogy with the costs of the air separation unit of oxy-fuel capture, which includes a similar scale and type of compression and cryogenic process.

The term frosting front as used herein refers to the point on the desublimation means at which the target compound starts to desublime on the surface. The term frost refers to the desublimed target compound on the surface.

The term circulate refers to the movement around the continuous path of the desublimation means. As a surface onto which the target compound desublimation may occur circulates around this continuous path, it may move relative to other parts of the desublimation means or may be held in a certain position relative to other parts of the desublimation means as the entire means circulates.

The apparatus of the present invention can be used in post combustion capture, oxy-fuel combustion and pre-combustion decarbonisation when the target compound is carbon dioxide. Preferably, it is used in a post-combustion process.

While carbon capture associated with power plants has been a significant focus for previous technologies, there is growing interest in other areas, for example for decarbonisation in energy intensive industry. The simplicity of the ing the apparatus discussed above. The apparatus may be scaled down to this level, in which case refuelling may be associated with unloading of liquid carbon dioxide to storage. The collected liquid carbon dioxide may then be transported onwards to reuse processes or to facilities for transfer to storage.

The desublimation means may comprise a granular material, such as a plurality of balls. This increases the surface area available for the desublimation of the target compound, thereby increasing the efficiency of the process and the amount of target compound that can desublime per length of the desublimation means. The desublimation means may comprise a packed bed including granular material, such as a plurality of balls. The granular material must be able to withstand the conditions involved in the desublimation and subsequent removal of the target compound, particularly the cycling of temperature at the operating temperatures. In this regard, the granular material may be ceramic or metallic. Both of these materials are readily available and are suitable for use in the desublimation of a target compound such as carbon dioxide.

The inlet through which the first gas mixture can enter the apparatus and contact the desublimation means may be located between the cooling means and the target compound recovery region on the path of the desublimation means.

The inlet provides a flow of gas into the continuous path of the desublimation means. The movement of the desublimation means may be in the opposite direction to the flow of the gas around the path of the desublimation means. This helps to create a static target compound frost front and helps to reduce the energy consumption of the apparatus. The formation of a static frost front is beneficial as its location can be controlled, such that it can be positioned at a specific location within the apparatus. The location may be varied by varying the conditions within the apparatus.

The movement of the gas from the inlet in the opposite direction to the movement of the desublimation means allows the arrangement of the invention to function in an analogous way to a distillation column rather than to a single temperature condenser, as the temperature falls in the direction of movement of the gas and rises in the direction of the desublimation means. The movement of the gas in the direction opposite to the movement of the desublimation means may therefore form a temperature gradient along at least part of the continuous path of the desublimation means.

This means that at each point along the path of the desublimation means, the vapour pressure of the solid target compound is in equilibrium with the vapour pressure in the gas at the temperature at that point. The vapour pressure of the target compound at the gas outlet is therefore determined by the temperature of the desublimation means at the gas outlet.

This is unlike the desublimation apparatus of the prior art, in which desublimation is conducted at a single temperature. Such arrangements can only achieve the same degree of separation as offered by the invention by providing all the cooling at the lowest temperature, which greatly increases the energy required. For example, a severe energy penalty is created at the typical temperatures of interest for carbon dioxide removal, which are around −125° C. The arrangements of the prior art cannot pre-cool the inlet gases close to such temperatures without deposition of the desubliming component inside a heat exchanger, which inherently restricts their performance and defeats the purpose of the process.

The desublimation means may not be fluidised, so that the temperature gradients produced by the flow of the gas in the opposite direction to the movement of the desublimation means are not lost.

The apparatus may further comprise an outlet through which the second gas mixture can leave the apparatus. The second gas mixture may be a low carbon dioxide stream, if carbon dioxide is the target compound. The second gas mixture may include one or more of the components of the first gas mixture other than the target compound.

The outlet may extend from the path of the desublimation means. The outlet may extend from the path of the desublimation means before or after the target compound recovery region and/or before or after the cooling means, with reference to the flow of gas around the path. Preferably, in the embodiment where the gas flows in the opposite direction to the movement of the desublimation means, the outlet may extend from the path of the desublimation means before the cooling means, with reference to the flow of gas around the path. The first gas mixture may be introduced into the system after the target compound recovery region, with reference to the flow of gas around the path. In this embodiment, at least part of the second gas mixture may be removed from the apparatus before it reaches the cooling means and the first gas mixture may be introduced without passing through the target compound recovery region. Said at least part of the second gas mixture may not enter the cooling means or the target compound recovery region of the apparatus.

The part of the path of the desublimation means from which the outlet extends may have different conditions of temperature and/or pressure compared to the target compound recovery region. Said part may be isolated from the target compound recovery region.

The second gas mixture may leave the path of the desublimation means at a point at which the target compound is in frost form on the desublimation means, thereby separating the target compound from the first gas mixture. This is preferable as it means that the separation of the target compound and the first gas mixture can be easily achieved due to the different states. Alternatively, the second gas mixture may leave the path of the desublimation means at a point at which the target compound has been removed from the desublimation means, or concurrently with the target compound being removed from the desublimation means. This may occur if the target compound is removed as a solid. The outlet through which the second gas mixture can leave the apparatus may extend from the target compound recovery region.

The term "desublimation region" as used herein refers to the region of the path of the desublimation means at which desublimation of the target compound from the first gas mixture onto the surface of the desublimation means occurs. The path of the desublimation means passes through the desublimation region. The apparatus may comprise a desublimation region. The desublimation region may be an isolated section of the path of the desublimation means. The desublimation region may have different conditions of temperature and/or pressure compared to other regions of the path of the desublimation means.

The cooling means may cool the desublimation means such that the temperature of the desublimation means, particularly the temperature of the surface of the desublimation means, in the desublimation region is lower than that in the target compound recovery region. The cooling means preferably lowers the temperature of the desublimation means and/or the surface of the desublimation means to that below the desublimation temperature of the target compound at the prevailing pressure in the desublimation region. The temperature of the desublimation means in the desublimation region may therefore be lower than the desublimation temperature of the target compound at the prevailing conditions in the desublimation region.

The temperature at which desublimation of the target compound occurs depends on the partial pressure of the target compound in the first gas mixture, which in turn depends on the pressure of the first gas mixture itself. The cooling means may lower the temperature of the desublimation means and/or the surface of the desublimation means to −90° C. to −140° C. when the pressure of the gas outlet from the desublimation region is 1 to 10 bara, particularly when the target compound is carbon dioxide. The partial pressure of the target compound in the first gas mixture as it first contacts the cooled desublimation means is preferably at least 30 mbar. The temperatures and pressures involved may be selected to create the desired residual level of the target compound in the second gas mixture. The temperature of the desublimation means at the point at which the second gas mixture is removed from the path of the desublimation means may determine the amount of the target compound present in the second gas mixture. The temperature may therefore be selected accordingly.

The desublimation region may comprise a temperature gradient, which may be created by the flow of the gas from the inlet in the opposite direction to the movement of the desublimation means. The properties of the temperature gradient, such as its position and the temperatures involved, may be varied to control the process performance.

The cooling means may cool the desublimation means before it reaches the desublimation region. The cooling means may act directly or almost directly before the desublimation means circulates into the desublimation region. The increase in temperature of the desublimation means as it moves between the cooling means and the desublimation region may be negligible. This means that no desublimation will occur onto the cooling means itself and instead, all desublimation of the target compound will occur onto the desublimation means.

The second gas mixture may be used to lower the temperature of the desublimation means. This may occur once the second gas mixture has been removed from the apparatus. The pressure and/or temperature of the second gas mixture may be reduced after it has been removed from the apparatus and before it is used to lower the temperature of the desublimation means. The second gas mixture may lower the temperature of the desublimation means before it circulates into the desublimation region and/or at another point on the continuous path of the desublimation means. This helps to reduce the energy consumption of the apparatus.

The second gas mixture may be used in a supplementary reverse Brayton refrigeration cycle to lower the temperature of the desublimation means. The second gas mixture may be expanded or its pressure reduced before it is used to lower the temperature of the desublimation means. The temperature of the second gas mixture may be lowered in another manner. The second gas mixture may be expanded through a turbine to recover the energy. This recovered energy may be used in the apparatus, thereby reducing the overall energy input required to separate the target compound from the first gas mixture. This increases the cooling potential of the second gas mixture without requiring a high energy input.

The second gas mixture may be used in the cooling means. The cooling means may cool the desublimation means before it passes through the desublimation region such that the temperature of the desublimation means in the desublimation region is lower than in the target compound recovery region.

The cooling means may comprise a heat exchanger. The second gas mixture may enter the heat exchanger in order to decrease the temperature of the desublimation means. Alternative sources of cool gas may be used in the heat exchanger, in addition to or instead of the second gas mixture. This lowers the energy requirement for reducing the temperature of the desublimation means to the required level.

The cooling means may make use of a cooled gas and may comprise directly contacting the desublimation means with a cooled gas. The cooled gas may be in counterflow to the movement of the desublimation means. The cooled gas may comprise the second gas mixture that has been removed from the apparatus, which may be cooled in an external refrigeration cycle. The heat rejected by such an external refrigeration cycle may be rejected to the environment or to some other region of the desublimation means, including the target compound recovery region. Alternative sources of cool gas may also be used, in addition to or instead of the second gas mixture. This lowers the energy requirement for reducing the temperature of the desublimation means to the required level and avoids the need for costly cryogenic heat exchangers.

The target compound recovery region may require further cooling to balance the energy flows from warming the desublimation means and changing the phase of the target compound frost on the surface of the desublimation means. Such further cooling may be provided by injecting the target compound as a liquid from an external source at a higher pressure into the target compound recovery region. The reduction of pressure will result in the liquid target compound being converted in part into the gas phase and in part into a solid, which will be deposited onto the surface of the desublimation means. Recovery of the additional target compound frost as a gas or a liquid will provide additional cooling. The quantity of liquid target compound injected into the target compound recovery region can be controlled to maintain the desired conditions in the target compound recovery region. This is particularly beneficial when the target compound is carbon dioxide.

Additionally or alternatively, the second gas mixture may be used in a secondary cooling means. Alternative sources of cool gas may be used in the secondary cooling means, in addition to or instead of the second gas mixture. The secondary cooling means may cool the desublimation means without using the second gas mixture.

The secondary cooling means may reduce the temperature of the desublimation means at points other than the cooling means. The secondary cooling means may reduce the temperature of the desublimation means while it is within the desublimation region, at a point on the continuous path away from the point at which it enters the desublimation region. The secondary cooling means may act at another point on the continuous path of the desublimation means. The secondary cooling means may be before or after the cooling means on the continuous path of the desublimation means, with reference to the movement of the desublimation means.

The secondary cooling means may therefore reduce the temperature of the desublimation means after the target compound frost front, at a location where frost may be present on the surface of the desublimation means. This may create a secondary desublimation region on the path of the desublimation means. A secondary desublimation means may further reduce the amount of target compound present in the second gas mixture.

The secondary cooling means may be a heat exchanger. The second gas mixture may enter the heat exchanger in order to decrease the temperature of the desublimation means. Alternative sources of cool gas may be used in the heat exchanger, in addition to or instead of the second gas mixture. This lowers the energy requirement for reducing the temperature of the desublimation means to the required level.

The secondary cooling means may comprise directly contacting the desublimation means with a cooled gas. The cooled gas may comprise the second gas mixture that has been removed from the apparatus. Alternative sources of cool gas may be used, in addition to or instead of the second gas mixture. This lowers the energy requirement for reducing the temperature of the desublimation means to the required level and avoids the need for costly cryogenic heat exchangers.

The desublimation means may comprise a secondary path that provides additional cooled desublimation means to the path within and/or after the desublimation region, with reference to the movement of the desublimation means. The secondary path may provide the additional cooled desublimation means after the cooling means, with reference to the movement of the desublimation means. The secondary path may provide the additional cooled desublimation means to a point on the path of the desublimation means after the desublimation means has circulated through the cooling means, with reference to the movement of the desublimation means. This may help to maintain the desublimation means below a required level throughout the desublimation region and may tailor the temperature profile of the desublimation means as it passes along the path to minimise energy consumption. This may also create a secondary desublimation region. A secondary desublimation means may further reduce the amount of target compound present in the second gas mixture.

If the desublimation means comprises a granular material, such as a plurality of balls, this secondary path may introduce additional cooled granular material to the path of the desublimation means within and/or after the desublimation region and/or after the cooling means, with reference to the movement of the desublimation means.

The desublimation means may carry the target compound in frost form from the desublimation region into the target compound recovery region. The target compound recovery region is the region of the continuous path in which target compound is separated from the desublimation means.

The target compound may leave the target compound recovery region as a solid, a gas or a liquid. The target compound may therefore be recovered from the apparatus as a solid, a gas or a liquid. The target compound may leave the target compound recovery region and/or be recovered as a gas. The target compound may leave the target compound recovery region and/or be recovered as a liquid. The production of the target compound as a liquid simplifies the subsequent transport to use or storage of the target compound.

The state of the target compound as it leaves the target compound recovery region is determined by the conditions within the target compound recovery region. The temperature and pressure of the target compound recovery region can be selected such that the target compound melts, evaporates or sublimes from the desublimation means, depending on the physical state of the target compound required. If it is desired to recover the target compound as a liquid, the pressure and temperature of the target compound recovery region may be maintained at levels at which target compound is liquid, particularly at levels at which carbon dioxide is liquid.

The target compound recovery region may comprise a temperature gradient, which may be created by the flow of the gas from the inlet in the opposite direction to the movement of the desublimation means. The properties of the temperature gradient, such as its position and the temperatures involved, may be varied to control the process performance.

The target compound may be removed from the desublimation means mechanically and/or by some other process. The solid target compound may be transferred to a storage region through a rotary valve or other sealing means which allows different conditions of pressure and/or temperature to prevail in the storage region.

The target compound, if a liquid or gas, may be pumped to a storage unit, or to a pipeline. The pressure of the liquid or gas removed from the apparatus may be suitable for delivery along a pipeline.

The temperature of the target compound recovery region may be increased relative to the desublimation region. This temperature increase may result from indirect heating. There may be no direct heating means that increases the temperature of the target compound recovery region. Indirect heating can be achieved by cooling the initial inflow of the first gas mixture and/or another stream of gas at a higher temperature.

The pressure of some or all of the regions in the apparatus may be at different levels with the movement of the desublimation means between them controlled using sealing means such as rotary valves to prevent undue leakage of gases between regions. This means that different regions on the path can have different pressures and allows the pressure of each region to be controlled, thereby allowing the conditions in each region to be tailored to the desired physical state of one or more of the components of the first gas mixture. The sealing means additionally may act to isolate regions of the apparatus to minimise leakage into the second gas mixture of the target compound that has been separated.

Some or all of the regions may comprise the same or similar pressures. For example, the target compound recovery region may have the same pressure as one or more other regions of the apparatus. The target compound recovery region may not be isolated in any way from one or more other regions.

The apparatus may further comprise a water vapour removal region in which water is removed from the first gas mixture. The path of the desublimation means or a secondary path of the desublimation means may extend through the water vapour removal region. The first gas mixture may pass through this region before it enters the desublimation region. This provides a means for removing water from the gas using the desublimation means.

In this embodiment, the desublimation means or secondary desublimation means may move counterflow to the first gas mixture. The desublimation means or secondary desublimation means may move in turn through a secondary cooling region, a water vapour removal region and a water recovery region. The secondary desublimation means may be a separate path of desublimation means to that used to remove the target compound.

The inlet for the first gas mixture, at a temperature of preferably less than 80° C., provides a flow of gas onto the surface of the desublimation means or secondary desublimation means between the water vapour removal region and the water recovery region. An outlet for the gases may be located between the secondary cooling region and the water vapour removal region.

An outlet through which water may leave the apparatus may extend from the water recovery region or the water vapour removal region. The water may be recovered as a liquid or as a solid. The water recovery region, if present, is downstream of the water vapour removal region with respect to the movement of the desublimation means. The water recovery region may comprise different conditions, such as temperature and/or pressure, than the water vapour removal region. These different conditions may mean that water is present as a liquid, solid or vapour in the water recovery region. The water may be recovered from the desublimation means as a liquid, solid or vapour. Preferably the water is removed as a liquid.

The water may be removed from the first gas mixture as a liquid as the temperature of the gas decreases. This decrease in temperature may occur as the gas comes into contact with the desublimation means.

Additionally or alternatively, the water may be removed as water frost on the desublimation means. The water vapour removal region may comprise a region of the path of the desublimation means onto which a water frost is formed. The frost of water may create an additional static frost front as the desublimation means moves. The frost front may occur after the desublimation region, with respect to the movement of the desublimation means.

Preferably, the water initially creates a liquid on the desublimation means at the point at which the first gas mixture first contacts the desublimation means within the water vapour removal region. As the first gas mixture passes along the desublimation means and its temperature is reduced, water frost will be deposited on the desublimation means. Said frost remains on the desublimation means as it passes towards the water recovery region. The water is then removed as a liquid in the water recovery region. The first gas mixture is then passed into the desublimation region, directly or indirectly.

After moving through the water recovery region, the desublimation means or secondary desublimation means may pass through the secondary cooling region. As it moves through this region it is cooled directly or indirectly by a flow of cold gas that may comprise the second gas mixture from the target compound removal stage of the apparatus. After cooling, the desublimation means or secondary desublimation means may move back into the water vapour removal zone.

Alternatively, there may be no water recovery region. Any water removed from the gas in the water vapour removal region may be carried into the secondary cooling region, where it may be re-evaporated.

According to a second aspect of the present invention, there is provided a system for removing a target compound from a first gas mixture comprising the target compound, comprising: a compressor or blower, a conduit that passes the first gas mixture from its source to the compressor or blower, a means for cooling the first gas mixture, the apparatus as described above and a conduit that passes the first gas mixture from the compressor or blower or the means for cooling the first gas mixture to the apparatus as described above.

The term "compressor" as used herein refers to a device for raising the pressure of a gas to flow through the apparatus.

This system further improves the removal of the target compound from a first gas mixture, which comprises the target compound. The first gas mixture comprises one or more other components, in addition to the target compound. The means for cooling the first gas mixture may lower the temperature of the first gas mixture to close to, but greater than, the desublimation temperature of the target compound. This means that less cooling is required by the desublimation means in order to desublime the target compound.

The system may be an existing system to which the apparatus is retrofitted, or may be an entire system in combination with the apparatus discussed above.

The compressor and the means for cooling the first gas mixture may be the same component, such that the first gas mixture is compressed and cooled at the same time. The compressor and the means for cooling the first gas mixture may be different components, with the means for cooling the first gas mixture being located before or after the compressor. Preferably, the means for cooling the first gas mixture is after the compressor, such that it cools the compressed gas. The means for cooling the first gas mixture may comprise two separate components such that the first gas mixture is cooled in two separate stages before it enters the apparatus.

The second gas mixture from the apparatus described above may be used in the means for cooling the first gas mixture. The means for cooling the first gas mixture may be part of the apparatus discussed above, or may be a separate component. The means for cooling the first gas mixture may be a heat exchanger and the second gas mixture from the apparatus discussed above may enter the heat exchanger in order to cool the first gas mixture. The temperature of the second gas mixture may have been lowered before it enters the means for cooling the first gas mixture, by expansion or otherwise, as discussed above. Alternative sources of cool gas may also be used, in addition to or instead of the second gas mixture.

The target compound recovery region of the apparatus described above may be used to cool components of the system or apparatus described above, as the target compound recovery region will require energy to melt, evaporate or desublime the target compound frost. This transfer of energy can be used to cool components of the system or apparatus described above, such as the first gas mixture. Any excess heat in the target compound recovery region may be removed by injecting liquid target compound into the region, as discussed above.

The second gas mixture may be used in a primary means for cooling the first gas mixture. The system may comprise a secondary means for cooling the first gas mixture. This secondary means may comprise a heat exchanger using the target compound recovery region. Alternatively, the primary means for cooling the first gas mixture may comprise such a heat exchanger, while the secondary means for cooling the first gas mixture comprises the second gas mixture.

The system may further comprise an expander through which the second gas mixture from the apparatus discussed above passes before it is released from the system. This increases the energy recovered from the second gas mixture. The second gas mixture may be expanded through a turbine to recover the energy. This recovered energy may be used in the system or apparatus discussed above, thereby reducing the overall energy input required to separate the target compound from the first gas mixture.

The system may further comprise a compressor through which at least part of the second gas mixture from the apparatus discussed above passes. The compressed gas can be used to melt the target compound frost or heat the second gas mixture. The cooled compressed gas may be expanded through a turbine or other device to provide additional cooling of the desublimation means.

The system may further comprise an outlet through which the second gas mixture can leave the system.

According to a third aspect of the present invention, there is provided a method of removing a target compound from a first gas mixture comprising the target compound, including the steps of: providing a desublimation means comprising a continuous path that passes through a cooling means and a target compound recovery region, cooling a portion of the desublimation means within the cooling means to a temperature below the desublimation temperature of the target compound, providing the first gas mixture to the path of the desublimation means such that it is in contact with a surface of the cooled portion of the desublimation means, thereby causing at least a portion of the target compound in the first gas mixture to desublime onto the surface of the desublimation means, moving the desublimation means along the continuous path such that the cooled portion circulates into the target compound recovery region, removing the target compound from the surface of the desublimation means in the target compound recovery region, moving the desublimation means along the continuous path such that the portion re-circulates into the cooling means and re-cooling the portion of the desublimation means to a temperature below the desublimation temperature of the target compound.

The method may be carried out using the apparatus or system described above. As such, the features outlined above in relation to the apparatus or system may apply equally to the method.

Delivery System for Specifically Targeting Cancer Cell and Method of Use Thereof The first gas mixture comprises the target compound and one or more other components. The target compound may be carbon dioxide. It is the cooling means that cools the portion of the desublimation means within the cooling means.

The inlet provides a flow of the first gas mixture into the continuous path of the desublimation means. The movement of the desublimation means may be in the opposite direction to the flow of the gas around the path of the desublimation means, as discussed above in relation to the apparatus.

The cooled portion of the desublimation means may be in the desublimation region for an amount of time sufficient for the target compound to desublime on the desublimation means. The method may comprise varying the speed at which the desublimation means moves in order to vary the amount of time that the cooled portion of the desublimation means is present in the desublimation region.

The desublimation means may move continuously at a single speed, or the speed may vary. The desublimation means may move in stages, such that portions of the desublimation means have dwell times within certain regions where the desublimation means is not moving or is moving more slowly. Preferably, the desublimation means moves continuously at a single speed, such that static frost fronts are formed.

The method may further comprise the step of removing a second gas mixture. The second gas mixture is the first gas mixture once some or all of the target compound has been removed using the invention. The second gas mixture has a lower amount of the target compound than the first gas mixture. This second gas mixture may be a low carbon dioxide stream, if carbon dioxide is the target compound. The second gas mixture may include one or more of the components of the first gas mixture other than the target compound.

The outlet may extend from the path of the desublimation means. The outlet may extend from the path of the desublimation means before or after the target compound recovery region and/or before or after the cooling means, with reference to the flow of gas around the path. Preferably, in the embodiment where the gas flows in the opposite direction to the movement of the desublimation means, the outlet may extend from the path of the desublimation means before the cooling means, with reference to the flow of gas around the path. The first gas mixture may be introduced into the system after the target compound recovery region, with reference to the flow of gas around the path. In this embodiment, at least part of the second gas mixture may be removed from the apparatus before it reaches the cooling means and the first gas mixture may be introduced without passing through the target compound recovery region. Said at least part of the second gas mixture may not enter the cooling means or the target compound recovery region.

The part of the path of the desublimation means from which the outlet extends may have different conditions of temperature and/or pressure compared to the target compound recovery region. Said part may be isolated from the target compound recovery region.

The second gas mixture may leave the path of the desublimation means at a point at which the target compound is in frost for on the desublimation means, thereby separating the target compound from the first gas mixture. This is preferable as it means that the separation of the target compound and the first gas mixture can be easily achieved due to the different states. Alternatively, the second gas mixture may leave the path of the desublimation means at a point at which the target compound has been removed from the desublimation means, or concurrently with the target compound being removed from the desublimation means. This may occur if the target compound is removed as a solid. The outlet through which second gas mixture can leave the apparatus may extend from the target compound recovery region.

The temperature at which desublimation of the target compound occurs depends on the partial pressure of the target compound in the gas, which in turn depends on the pressure of the gas itself. The desublimation means or a surface thereof may be cooled to $-90°$ C. to $-140°$ C. when the pressure of the gas at the outlet from the desublimation means is 1 to 10 bara, particularly when the target compound is carbon dioxide. The partial pressure of the target compound in the first gas mixture as it first contacts the cooled desublimation means is preferably at least 30 mbar. The temperatures and pressures involved may be selected to create the desired residual level of the target compound in the second gas mixture. The temperature of the desublimation means at the point at which the second gas mixture is removed from the path of the desublimation means may determine the amount of the target compound present in the second gas mixture. The temperature may therefore be selected accordingly.

The desublimation region may comprise a temperature gradient, which may be created by the flow of the gas from the inlet in the opposite direction to the movement of the desublimation means. The properties of the temperature gradient, such as its position and the temperatures involved, may be varied to control the process performance.

The second gas mixture may be used to cool the desublimation means. This may occur once the second gas mixture has been removed from the apparatus. The method may further comprise the step of reducing the temperature and/or pressure of the second gas mixture before it is used to cool the desublimation means. The second gas mixture may lower the temperature of the desublimation means before it circulates into the desublimation region and/or at another point on the continuous path of the desublimation means. This may occur before the desublimation means circulates into the desublimation region and/or at another point in the desublimation means, as discussed above.

The second gas mixture may be used in a supplementary reverse Brayton refrigeration cycle to lower the temperature of the desublimation means. The second gas mixture may be expanded or its pressure reduced once it is removed. This expansion or pressure drop may occur before it is used to lower the temperature of the desublimation means. The temperature of the second gas mixture may be lowered in another manner. The second gas mixture may be expanded through a turbine to recover the energy. This increases the cooling potential of the second gas mixture while reducing the overall energy input.

The second gas mixture may be used to cool the desublimation means before it circulates into the desublimation region such that the temperature of the desublimation means in the desublimation region is lower than in the target compound recovery region. The cooling of the desublimation means may be achieved using a cooling means, as described above in relation to the apparatus. The desublimation means may be cooled using a heat exchanger and/or direct contact with a cooled gas, as discussed above. Said cooled gas may comprise the second gas mixture.

The method may further comprise the step of further reducing the temperature of the desublimation means using a secondary cooling means. This means may comprise a heat exchanger and/or direct contact of the desublimation means with a cooled gas, as discussed above. The secondary cooling means may make use of the second gas mixture. The secondary cooling means may reduce the temperature of the desublimation means at points other than the cooling means, as discussed above. The secondary cooling means may be before or after the cooling means on the continuous path of the desublimation means, with reference to the movement of the desublimation means.

The method may further comprise the step of compressing and/or cooling the first gas mixture before it is provided to the path of the desublimation means. This may be done using the means for cooling a gas described above in relation to the system. The temperature of the first gas mixture may be cooled to close to, but greater than, the desublimation temperature of the target compound. This means that less cooling is required by the desublimation means in order to desublime the target compound, thereby improving the removal of the target compound from the first gas mixture.

The step of cooling the first gas mixture before it is provided to the path of the desublimation means may utilise the second gas mixture. This may be done using a heat exchanger, as discussed above in relation to the system. The second gas mixture may be expanded or its pressure reduced before it is used to lower the temperature of the first gas mixture.

The heating of the target compound recovery region such that the target compound is recovered as a liquid or a gas may also be used to cool another part of the apparatus or system, such as the first gas mixture, as discussed above in relation to the system.

The method may further comprise the step of expanding the second gas mixture after it has been removed. The second gas mixture may be expanded through a turbine. This increases the energy recovered from the second gas mixture. This recovered energy can be used in the system or apparatus discussed above, thereby reducing the overall energy input required to separate the target compound.

The method may further comprise the step of compressing at least part of the second gas mixture after it has been removed. This compressed gas may be used to heat the target compound recovery region and provide additional cooling to the desublimation means, as discussed above in relation to the system.

The method may further comprise the step of providing additional cooled desublimation means to the path after the desublimation region, with reference to the movement of the desublimation means. The cooled desublimation means may be provided after the cooling means, with reference to the movement of the desublimation means. The additional cooled desublimation means may be provided to a point on the path of the desublimation means after the desublimation means has circulated through the cooling means, with reference to the movement of the desublimation means, as discussed above in relation to the apparatus. This may help to maintain the desublimation means below a required level throughout the desublimation region and may tailor the temperature profile of the desublimation means as it passes along the path to minimise energy consumption. This may also create a secondary desublimation region. A secondary desublimation means may further reduce the amount of the target compound present in the second gas mixture.

If the desublimation means comprises a granular material, such as a plurality of balls, additional cooled granular material may be introduced to the path of the desublimation means within and/or after the desublimation region and/or the cooling means, with reference to the movement of the desublimation means.

The method may further comprise an additional step of cooling the desublimation means at a point other than at the cooling means. This may be achieved using the secondary cooling means discussed above in relation to the apparatus.

The first gas mixture may be provided to the desublimation means, the desublimation means may be cooled, the target compound may be removed and the second gas mixture may be removed continuously. One or more of the steps may be occurring concurrently.

The state of the target compound as it leaves the target compound recovery region is determined by the conditions within the target compound recovery region. The target compound may be removed from the target compound recovery region as a solid, a liquid or a gas. Preferably, the target compound is removed as a gas or liquid, as discussed above.

The conditions of the target compound recovery region may be sufficient to change the state of target compound from a solid to a liquid or a gas. The temperature and pressure of the target compound recovery region may be selected such that the target compound melts, evaporates or sublimes from the desublimation means, depending on the physical state of target compound required. If it is desired to recover the target compound as a liquid, the pressure and temperature of the target compound recovery region may be maintained at levels at which target compound, such as carbon dioxide, is liquid. The temperature of the target compound recovery region may be increased relative to the desublimation region by indirect heating, as discussed above.

The target compound may be removed from the desublimation means mechanically and/or by some other process. The solid target compound may be transferred to a storage region through a rotary valve or other sealing means which allows different conditions of pressure and/or temperature to prevail in the storage region.

The desublimation means may comprise a granular material, such as a plurality of balls, which may optionally be ceramic or metallic, as described above in relation to the apparatus.

The method may further comprise the step of removing water from the first gas mixture. This may occur in a water vapour removal region, through which the desublimation means or a secondary desublimation means circulates when moving along its continuous path or on a separate secondary path. This step may occur before the first gas mixture is provided to the desublimation region.

In the water vapour removal region the desublimation means or secondary desublimation means may move counterflow to the gas. The secondary desublimation means may move in turn through a secondary cooling region, a water vapour removal region and a water recovery region. The secondary desublimation means may be a separate path of desublimation means to that used to remove the target compound.

The inlet for the first gas mixture, at a temperature of preferably less than 80° C., provides a flow of gas onto the surface of the desublimation means or secondary desublimation means between the water vapour removal region and the water recovery region. An outlet for the gases may be located between the secondary cooling region and the water vapour removal region.

The water may leave the apparatus via an outlet, which may extend from the water recovery region or the water vapour removal region. The water recovery region, if present, is downstream of the water removal region with reference to the movement of the desublimation means. The water recovery region may comprise different conditions, such as temperature and/or pressure, than the water vapour removal region. These different conditions may mean that water is present as a liquid, solid or vapour. The water may be recovered from the desublimation means as a liquid, solid or vapour in the secondary removal region. Preferably the water is removed as a liquid.

The water may be removed from the first gas mixture as a liquid as the temperature of the gas decreases. This decrease in temperature may occur as the gas comes into contact with the desublimation means.

Additionally or alternatively, the water may be removed as water frost on the desublimation means. The water removal region may comprise a region of the path of the desublimation means onto which a water frost is formed. The frost of water may create an additional static frost front as the desublimation means moves. The frost front may occur after the desublimation region, with respect to the movement of the desublimation means.

Preferably, the water initially creates a liquid on the desublimation means at the point at which the first gas mixture first contacts the desublimation means within the water vapour removal region. As the first gas mixture passes along the desublimation means and its temperature is reduced, water frost will be deposited on the desublimation means. Said frost remains on the desublimation means as it passes towards the water recovery region. The water is then removed as a liquid in the water recovery region. The first gas mixture is then passed into the desublimation region, directly or indirectly.

After moving through the water recovery region, the desublimation means or secondary desublimation means may pass through the secondary cooling region. As it moves through this region it is cooled directly or indirectly by a flow of cold gas that may comprise the second gas mixture from the target compound removal stage of the apparatus. After cooling the desublimation means or secondary desublimation means may move back into the water vapour removal zone.

Alternatively, there may be no water recovery region. Any water removed from the gas in the water vapour removal region may be carried into the secondary cooling region, where it may be re-evaporated.

Preferably, if the target compound is carbon dioxide, the method removes over 90% of the carbon dioxide present in the gas. The second gas mixture removed may comprise between 0.02 to 2% of carbon dioxide. In embodiments where the first gas mixture is a flue gas, the method may remove between 70% and 100% of the fossil carbon dioxide content of the gas and up to 50% of the natural atmospheric carbon dioxide content.

According to a fourth aspect of the present invention, there is provided a use of the apparatus or system described above to remove a target compound from a first gas mixture including the target compound via desublimation.

The first gas mixture comprises a target compound and one or more other components. The target compound may be carbon dioxide. The first gas mixture may result from an industrial process including a raw natural gas stream or a chemical reaction or combustion process or the exhaust of a ship or a vehicle, such as an HGV. The first gas mixture may be a process or exhaust gas from an industrial process or the exhaust gas of a vehicle or ship. The apparatus may comprise part of a system as described above.

Thus, according to a fifth aspect of the present invention, there is provided a vehicle, a ship or an industrial process comprising the apparatus or the system as discussed above.

Figure 1:
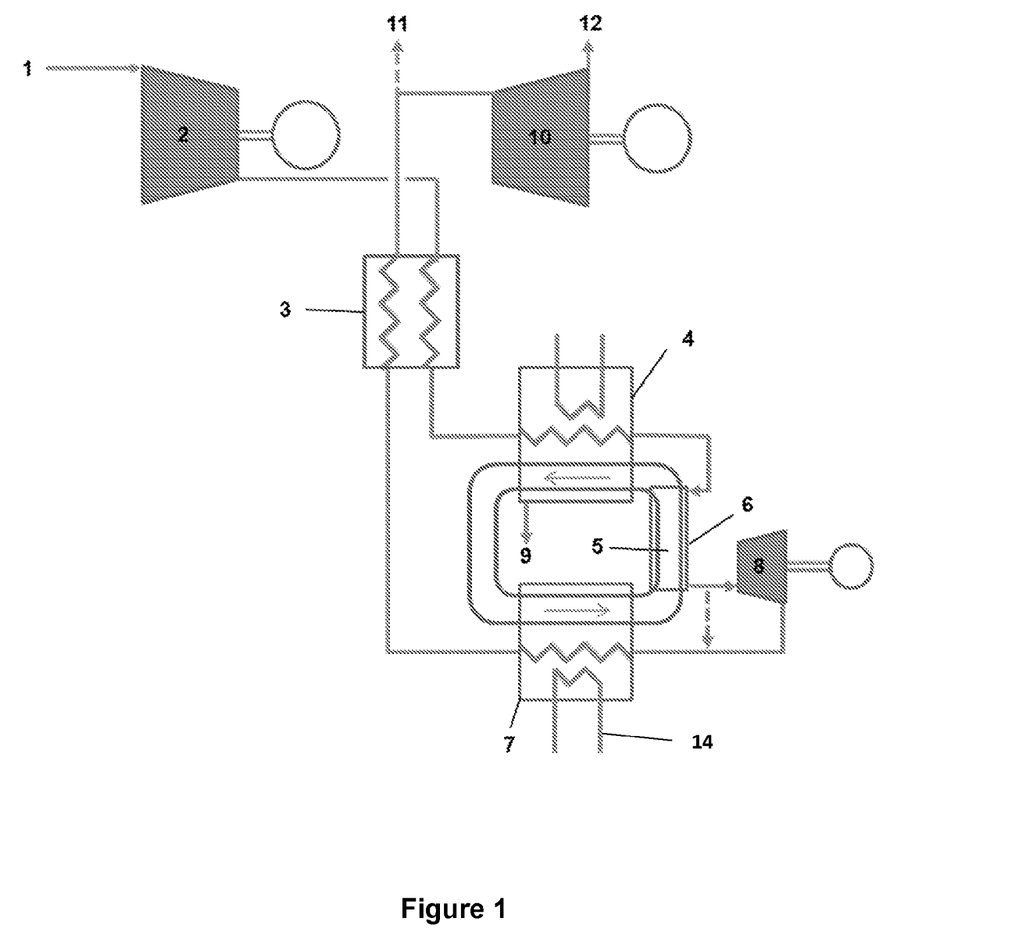
FIG. 1 illustrates a system including an apparatus according to the present invention.

In FIG. 1, a first gas mixture 1 comprising carbon dioxide as the target compound and one or more other components is introduced into the system and is passed through blower or compressor 2. The compressed gas 1 then passes through reheater 3 where it is cooled to a temperature greater than the desublimation temperature of carbon dioxide. The cooled compressed gas 1 then passes into the target compound recovery region, i.e. carbon dioxide recovery region 4, which is isolated from but in thermal contact with a portion of the desublimation means 5. The gas 1 is cooled as it passes through carbon dioxide recovery region 4 to a temperature close to the desublimation temperature of carbon dioxide under the conditions in the desublimation region 6.

The gas 1 then enters the path of the desublimation means 5, flowing in the opposite direction to the movement of the desublimation means 5. The desublimation means 5 moves continuously at a single speed along a continuous path throughout the process, as demonstrated by the arrows in FIG. 1. The desublimation means has been cooled in cooling means 7 and moves through desublimation region 6, towards the carbon dioxide recovery region 4. Optionally and not shown in FIG. 1, the desublimation means 5 may be divided so that only part moves through the whole length of the cooling means 7 and desublimation region 6.

Once the gas 1 has entered the path of the desublimation means, it flows in direct contact with the cooled section of the desublimation means 5 along desublimation region 6, where carbon dioxide desublimes as a frost onto a surface of the desublimation means 5. A frost front forms where the coldest section of the desublimation means 5 makes contact with the gases leaving the desublimation region 6.

From the desublimation section 6, the surface of the desublimation means 5 moves into the carbon dioxide recovery region 4. The desublimation means 5 is isolated from the gas stream within the carbon dioxide recovery region 4. There may also be an additional feed from an external heat source into the carbon dioxide recovery region 4 isolated from the gas stream in the carbon dioxide recovery region 4. The conditions in the carbon dioxide recovery region 4 are such that the carbon dioxide frost sublimes to a gas or melts to form a liquid, which is removed as carbon dioxide stream 9. Thus, the carbon dioxide is removed from the gas 1.

After the carbon dioxide is removed from the desublimation means 5, the desublimation means 5 continues to circulate to cooling means 7, which cools the desublimation means 5 to a temperature corresponding to the desublimation temperature of the desired residual carbon dioxide content of the second gas mixture. The desublimation means 5 then recirculates back into desublimation region 6, where the process continues.

The second gas mixture, once the carbon dioxide has desublimed in desublimation region 6, is removed from the desublimation means 5 and passed into expander 8. This further reduces its temperature, such that it can then be used in direct contact or through an isolated heat exchange zone in cooling means 7 to lower the temperature of the desublimation means 5. There is also an additional feed 14 from an external refrigeration cycle into the cooling means 7. This additional feed allows the refrigerant to be used in direct contact or through an isolated heat exchange zone to cool the desublimation means 5, which further lowers the temperature of the desublimation means 5.

The second gas mixture is then passed from cooling means 7 to the reheater 3, where it is used to cool the compressed gas 1 before the compressed gas 1 enters the carbon dioxide recovery region 4. The second gas mixture may then be exhausted as low carbon dioxide stream 11 or be expanded through a turbine 10, which generates more energy that can be used to power components of the apparatus, such as the compressor 2. Any gas expanded through turbine 10 is released as a low carbon dioxide stream 12.

Figure 2:
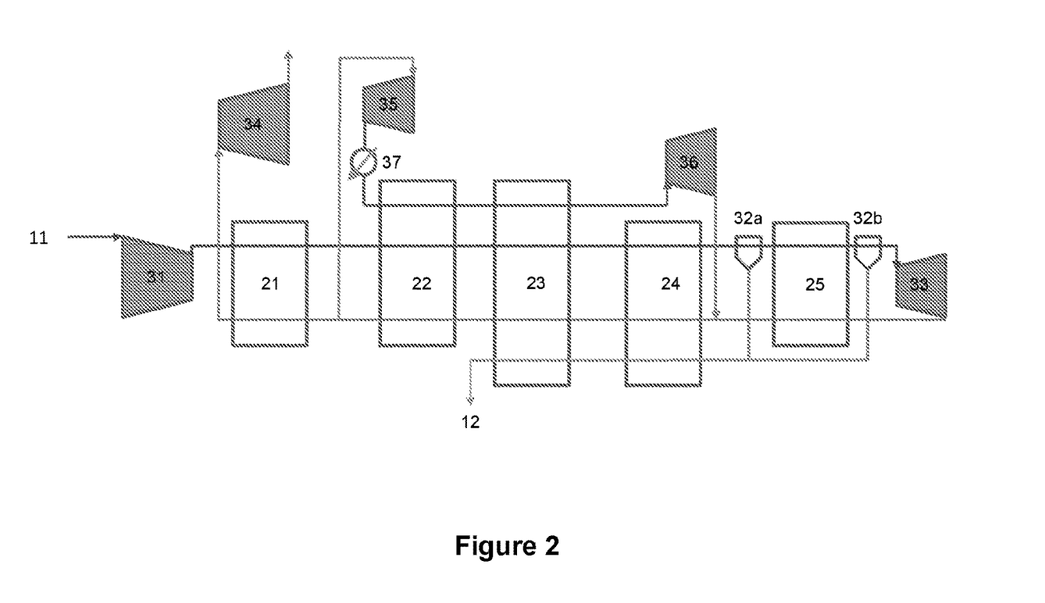
FIG. 2 illustrates an apparatus according to the present invention represented as a conventional heat exchange process.

FIG. 2 illustrates the apparatus of the present invention as a conventional heat exchange process. A first gas mixture 11 comprising carbon dioxide as the target compound and one or more other components enters the system via compressor 31. The compressed gas 11 then passes through reheater 21 where it is cooled.

The cooled compressed gas 11 then passes a heat recovery unit 22 and a carbon dioxide melting unit 23, which further cool the gas 11. The cooled compressed gas is then at a temperature slightly above the desublimation temperature of carbon dioxide when it enters the first desublimation region 24. It is within the first desublimation region 24 where the desublimation of the carbon dioxide starts to occur. The desublimation of the carbon dioxide continues in the second desublimation region 25.

Carbon dioxide is recovered from both the first desublimation region 24 and the second desublimation region 25 using carbon dioxide separators 32a and 32b respectively. The carbon dioxide separators initially separate the carbon dioxide as a solid, which is then passed through the first desublimation region 24 and the carbon dioxide melting region 23, to increase the temperature of the solid. This creates a flow of liquid or gaseous carbon dioxide 12 which is recovered from the system.

The second gas mixture is also recovered from the second desublimation region 25 and passed into expander 33 in order to further reduce the temperature of the gas. The cooled second gas mixture is then passed back through the second desublimation region 25, the first desublimation region 24, the carbon dioxide melting unit 23, the heat recovery unit 22 and the reheater 21, all of which increase the temperature of the second gas mixture while cooling the compressed gas 11. The second gas mixture is then expanded through a turbine 34 and any energy is recovered before it is released as low carbon dioxide stream 13.

A portion of the second gas mixture is diverted from the stream between the heat recovery unit 22 and the reheater 21. This gas stream is passed into compressor 35, after which the compressed gas at elevated temperature is cooled in heat rejection zone 37, heat recovery unit 22 and carbon dioxide melting unit 23, warming the exhaust gases and melting the carbon dioxide in the respective units. A final expander 36 is then used to lower the temperature of the gas before it is fed back into the second gas mixture stream deriving from the second desublimation region 25 to provide additional cooling to the first desublimation region 24.

Figure 3:
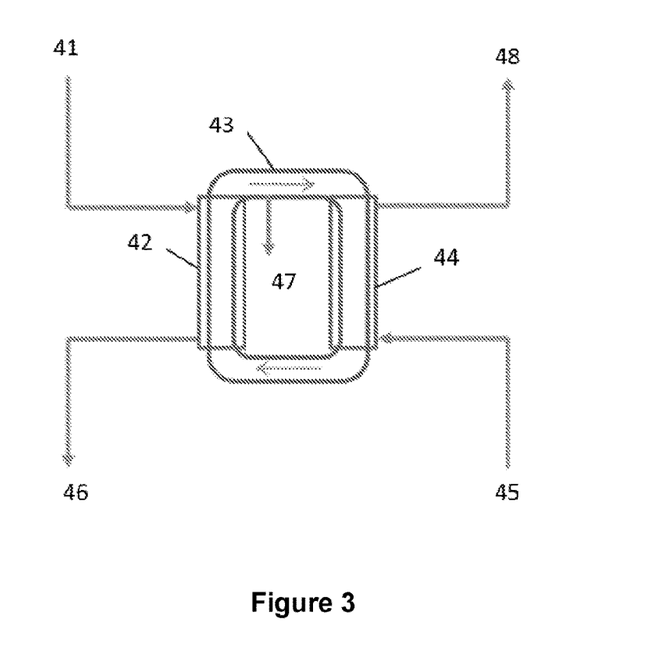
FIG. 3 illustrates an apparatus for cooling a gas comprising carbon dioxide, removing water vapour and reheating the second gas mixture according to the present invention.

FIG. 3 illustrates a reheater for use in FIG. 1 to cool and remove water from the first gas mixture and to reheat the second gas mixture. The first gas mixture 41 comprising carbon dioxide as the target compound and one or more components including water vapour is blown into the secondary cooling region 42.

The desublimation means 43 moves in the opposite direction to and in contact with the gas 41 through the secondary cooling region 42. The desublimation means enters the secondary cooling region 42 at a low temperature having passed through the reheating region 44 where it has been cooled by the counterflow of cold second gas mixture 45.

The gas 41 is cooled progressively as it passes through the secondary cooling region 42 and when the gas temperature reaches the dewpoint, water vapour in the gas 41 will condense on the desublimation means 43. The gas 41 will be cooled further and will reach the freezing point of water and further cooling of the gas 41 as it passes through the cooling region 42 will result in ice being deposited onto the desublimation means 43. The gas 41 will discharged at low temperature and with a reduced water vapour content as process gas 46. The water vapour content of process gas 46 will be determined by the lowest temperature of the desublimation means 43.

The desublimation means 43 moves through the secondary cooling region 42 carrying water and ice to progressively higher temperatures as it is warmed by the incoming gas 41. The ice will be melted and the desublimation means will leave the secondary cooling region carrying water on its surface. The water may be drained as liquid 47 from the desublimation means 43. The desublimation means 43 moves continuously from the secondary cooling region 42 into the reheating region 44 where it is cooled by the second gas mixture 45 before completing its cycle by returning to the secondary cooling region 42.

The cold second gas mixture 45 enters the reheating region 44 and flows in counterflow and in contact with the desublimation means 43. The cold second gas mixture 45 cools the desublimation means 43 and is warmed progressively as it passes along the reheating region. Any water on the surface of the desublimation means 43 is evaporated by the dry second gas mixture 45 before it is discharged as warm gas 48.

The invention claimed is:

1. An apparatus for desubliming a target compound from a first gas mixture comprising the target compound, comprising:
   a desublimation surface comprising a surface onto which desublimation of the target compound occurs;
   a target compound recovery region;
   an outlet through which the target compound leaves the target compound recovery region;
   a heat exchanger that cook the desublimation surface; and
   a desublimation region; and
   an inlet through which the first gas mixture enters the apparatus such that is comes into contact with the surface of the desublimation surface, wherein the inlet is located between the heat exchanger and the target compound recovery region;
   wherein the desublimation surface forms a continuous path that passes through the heat exchanger, the desublimation region, and the target compound recovery region, wherein the desublimation surface is movable such that the surface continuously circulates between the heat exchanger and the target compound recovery region, along the continuous path,
   wherein the desublimation region is a section of the continuous path having different conditions of temperature and/or pressure from other regions of the continuous path,
   wherein the heat exchanger cook the desublimation surface such that the temperature of the desublimation surface in the desublimation region is lower than that in the target compound recovery region, and
   wherein the flow of gas is in the opposite direction to the direction of movement of the desublimation surface.

2. The apparatus according to claim 1, wherein the desublimation surface comprises a granular material, wherein the granular material comprises a plurality of balls.

3. The apparatus according to claim 2, wherein the balls are ceramic or metallic.

4. The apparatus according to claim 1, further comprising an outlet through which a second gas mixture leaves the apparatus.

5. The apparatus according to claim 4, wherein the outlet extends from the continuous path at a location such that at least part of the second gas mixture is removed from the continuous path before it reaches the heat exchanger.

6. The apparatus according to claim 4, wherein the second gas mixture is used to lower the temperature of the desublimation surface once it has been removed from the apparatus.

7. The apparatus according to claim 6, wherein the second gas mixture is expanded or its pressure is reduced before it is used to lower the temperature of the desublimation surface.

8. The apparatus according to claim 6, wherein the second gas mixture is used in the heat exchanger and/or wherein it is used in a secondary heat exchanger.

9. The apparatus according claim 1, wherein the heat exchanger is directly contacting the desublimation surface with a cooled gas.

10. The apparatus according to claim 1, wherein additional cooled desublimation surface can be provided to a point on the continuous path after the desublimation surface has circulated through the heat exchanger.

11. The apparatus according to claim 1, wherein the conditions of the target compound recovery region are such that the target compound leaves the target compound recovery region as a liquid.

12. The apparatus according to claim 11, wherein the pressure and temperature of the target compound recovery region is maintained at levels at which the target compound is liquid.

13. The apparatus according to claim 1, comprising a water removal region in which water is removed from the first gas mixture.

14. A system for removing a target compound from a first gas mixture comprising the target compound, comprising:
a compressor or blower;
a conduit that passes the first gas mixture from its source to the compressor or blower;
a heat exchanger for cooling the first gas mixture;
the apparatus for desubliming a target compound according to claim 1; and
a conduit that passes the first gas mixture from the compressor or blower or the heat exchanger for cooling the first gas mixture to the apparatus according to claim 1.

15. The system according to claim 14, wherein a second gas mixture is removed from the apparatus for desubliming a target compound and is used in the heat exchanger for cooling the first gas mixture.

16. The system according to claim 14, further comprising an expander through which a second gas mixture that is removed from the apparatus for desubliming a target compound passes before it is released from the system.

17. A method for removing a target compound from a first gas mixture via desublimation, comprising:
feeding the first gas mixture into the inlet of the apparatus of claim 1; and
removing the target compound from the target compound recovery region of the apparatus.

18. The method according to claim 17, wherein the first gas mixture is an exhaust gas or process gas stream from an industrial process or a vehicle or ship.

19. A vehicle, a ship or an industrial device or system, comprising the apparatus according to claim 1.

* * * * *